United States Patent [19]
Altshuler et al.

[11] Patent Number: 5,719,794
[45] Date of Patent: Feb. 17, 1998

[54] PROCESS FOR THE DESIGN OF ANTENNAS USING GENETIC ALGORITHMS

[75] Inventors: Edward E. Altshuler, Newton; Derek S. Linden, Cambridge, both of Mass.

[73] Assignee: United States of America as represented by the Secretary of the Air Force, Washington, D.C.

[21] Appl. No.: 505,712

[22] Filed: Jul. 19, 1995

[51] Int. Cl.$^6$ ............................................. G06T 17/40
[52] U.S. Cl. .................................................. 364/578
[58] Field of Search .......................... 364/512, 578; 395/500, 13; 343/729, 730

[56] References Cited

U.S. PATENT DOCUMENTS

| | | | |
|---|---|---|---|
| 4,327,417 | 4/1982 | Zaczek | 364/578 |
| 4,742,473 | 5/1988 | Shugar et al. | 364/518 |
| 5,224,056 | 6/1993 | Chene et al. | 364/490 |
| 5,289,198 | 2/1994 | Altshuler | 343/729 |
| 5,361,403 | 11/1994 | Dent | 455/74 |
| 5,390,282 | 2/1995 | Koza et al. | 395/13 |
| 5,394,509 | 2/1995 | Winston | 395/13 |

OTHER PUBLICATIONS

Johnson et al., Genetic Algorithm Optimization and its Application to Antenna Design, IEEE, pp. 326–329, Mar. 1994.

Marano et al., Syntesis of Antenna Arrays Using Genetic Algorithms, IEEE, pp. 328–332, May 1995.

Bahr et al., Design of Ultra-Broadhead Loaded Monopoles, IEEE, p. 12901293, Mar. 1994.

Christodoulou et al, Application of the ARTMAP Neural Network in the Design of Cascaded Gratings and Frequency Selective Surfaces, IEEE, pp. 562–565, Mar. 1994.

*Primary Examiner*—Kevin J. Teska
*Assistant Examiner*—Matthew Loppnow
*Attorney, Agent, or Firm*—William G. Auton

[57] ABSTRACT

A computerized process can design antennas using a completely deductive approach, that is, the desired electromagnetic properties are specified and the wire configuration that most closely produces the optimum result is synthesized. This new process uses a genetic algorithm in conjunction with an electromagnetic code. The genetic algorithm randomly selects a sample set of possible wire configurations from among all possible wire configurations. The performance of each configuration is computed using the electromagnetic code and ranked in order of quality. Partial solutions to this problem are obtained by "mating" the best wire configurations with one another. This evolutionary process is continued until an optimal wire configuration is obtained. Although this new process has only been tested on wire antennas, it can be used to design printed antennas, microstrip antennas, patch antennas and any other type of antenna that can be analyzed using an electromagnetic code.

14 Claims, 2 Drawing Sheets

PROCESS FOR THE DESIGN OF ANTENNAS USING GENETIC ALGORITHMS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a computerized process for synthesizing antenna designs.

In 1887, Hertz demonstrated experimentally the existence of electromagnetic waves thus confirming Maxwell's predictions. Hertz used copper wires end-loaded with large spheres which were excited by a spark discharge to launch the wave. In 1898, Braun designed a circuit consisting of a spark gap in the primary which was inductively coupled to a linear antenna in the secondary circuit; this was the first wire antenna.

Over the years a variety of wire antennas have been designed; e.g. the dipole and its counter-part monopole over a ground plane, rhombic, beverage, yagi, log periodic, loop, helix, and spiral antennas. It was later shown that some of these antennas could also be fabricated using printed circuit techniques. This process starts with a copper-clad sheet of circuit board. The unwanted copper is peeled or etched away so that only the desired conductor configuration remains. It is possible to bend the circuit board so that the antenna can take non-planar as well as planar shapes. Thus a wire is replaced by an equivalent flat copper strip. Antennas fabricated using this printed circuit process are referred to as printed antennas. If the strip is over a ground plane this type of antenna is then called a microstrip antenna and the dielectric between the strip and the ground plane is the substrate. Microstrip antennas are usually fabricated from printed circuit board copper clad on both sides; thus one side serves as the ground plane and the other side is etched to produce the desired strip configuration. If the strip is wide then this shape is referred to as a patch antenna. These antennas were designed using an inductive process, that is, an integral equation for the current distribution on each of the wires was formulated and the electromagnetic properties of the antenna were then calculated. This design approach was typically limited to relatively simple wire structures. In general, an engineer finds an existing design that may have the desired electromagnetic characteristics. He works with appropriate equations, if any exist, to determine its proper dimensions and parameters, and uses a simulator, which is often available, to predict its performance. If the performance is not acceptable the engineer redesigns and resimulates the antenna, using intuition to determine which parameters to change to improve performance. This procedure has produced many different antenna designs with different characteristics; but it is time-consuming and does not always produce truly optimum results. It requires that the engineer be familiar with the many different designs that exist, and also have enough experience so that he can reach an acceptable solution in a reasonable amount of time.

In addition, this procedure limits the types of designs that are tried to those that have an intuitive logic about them. Symmetry is often present, and structures are kept relatively simple to allow for easier understanding and analysis. Nearly all of these designs have the characteristic of "making sense" when one looks at them. Most all of them look like they should work. As an example, Altshuler (U.S. Pat. No. 5,289,198) invented a Double-Folded Monopole using an analytical approach. His objective was to design an antenna that would be circularly polarized over the hemisphere. He experimented by inserting different types of antenna elements into a monopole. These elements were selected based on his many years of experience in antenna design, logic and intuition. As we will describe later, the antennas that we have thus far designed through the use of our new process are different from those a rational human designer would have ever thought of, let alone tried.

When the high speed digital computer became available it was then possible to analyze more complex wire structures and also to optimize wire antennas using computer aided design technologies. Computer aided design systems are commonly used to modify a variety of prototype models to optimize performance parameters. Unfortunately, such systems rely on an initial design prototype which is modified rather than created by the computer. For the most part the general shape of the wire antenna is still predetermined and only the individual wires that constitute that particular configuration are optimized.

The use of a genetic algorithm (GA) has the potential of allowing the computer to totally design the antenna without an initial model. Genetic algorithms are probabilistic optimization processes that start from a population of randomly-generated potential solutions, and gradually evolve toward better solutions through a repetitive application of genetic operators. Relevant prior art includes the following U.S. Patents, the disclosures of which are incorporated herein by reference:

U.S. Pat. No. 5,289,198 issued to Altshuler;
U.S. Pat. No. 5,361,403 issued to Sent;
U.S. Pat. No. 5,224,056 issued to Chene et al;
U.S. Pat. No. 5,394,509 issued to Winston; and
U.S. Pat. No. 5,390,282 issued to Hopkins.

The use of GAs is distinct from the limited computer aided design approach in that the computer itself will both create and modify an antenna configuration to satisfy the user requirements.

SUMMARY OF THE INVENTION

There is a large class of electromagnetic radiators designated as wire antennas. In the design of these antennas an inductive process is used, that is, an integral equation for the current distributions on the wires that make up the antenna is formulated so that the electromagnetic properties of the antenna can then be determined.

The present invention includes a computerized process for the design of wire antennas using a GA in conjunction with an electromagnetic code. The result is a new process for the design of antennas, that uses a completely deductive approach; that is, the desired electromagnetic properties of the antenna are specified and the physical configuration that most closely produces these results is then synthesized. The only constraints on the antenna design are its size and any other relevant constraints (such as materials to use, e.g. thin wires); its shape is unspecified by the human operators. Although this process has only been tested on wire antennas, it can be used to design printed antennas, microstrip and patch antennas and any other antenna that can be analyzed using an electromagnetic code.

One embodiment of the present invention is a three-step process. In step 1, the electromagnetic properties of the desired antenna are specified. These properties can include, but are not limited to the radiation pattern, frequency range, polarization and input impedance.

In the second step a genetic algorithm and a suitable electromagnetic code are selected. The electromagnetic code computes the resulting antenna prospectives from each wire configuration designated by the GA. A suitable example of such a code is the Numerical Electromagnetics Code (NEC). A NEC code and program description are provided in a technical report by the Naval Ocean Systems Center of San Diego, Calif. This report is entitled "Numerical Electromagnetics Code (NEC)—The Method of Moments" and further identified as NOSC TD 116, the disclosure of which is incorporated herein by reference.

Further descriptions of these principles can be found in the following publications, the disclosures of which are incorporated herein by reference:

Goldberg, David E., Genetic Algorithms in Search, Optimization & Machine Learning, Addison-Wesley (1989).

Holland, J. H., Genetic Algorithms, Scientific American, July 1992, pp. 66–72.

Altshuler, E. E., A monopole loaded with a modified folded dipole, IEEE Trans. Antennas and Propagation, Vol. 41, July, 1993, pp. 871–876.

Altshuler, E. E., U.S. Pat. No. 5,289,198, Double-folded monopole, Feb. 22, 1994.

Bahr, M. et al., Design of ultra-broadband monopoles, IEEE AP-S Symposium, Seattle, Wash. June 1994.

Haupt, R. L., Thinned arrays using genetic algorithms, IEEE Trans. Antennas and Propagation, Vol. 42, July, 1994., pp. 983–999.

In a third step, the GA creates the proposed set of preliminary wire configurations for evaluation by the NEC and then proceeds to obtain an optimized design for an antenna that most closely satisfies the user requirements.

It is an object of the present invention to provide a computerized process for the design of antennas with optimized performance characteristics.

It is another object of the present invention to eliminate the requirements of human-developed prototype models in computer-designed antennas.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

The invention will become more apparent from the following detailed specification and drawings in which.

DETAILED DESCRIPTION OF THE PREFERRED EMBODIMENT

The present invention includes a new computerized process for the design of antennas using a genetic algorithm in conjunction with an electromagnetic code.

An algorithm is a procedure for solving a mathematical problem usually consisting of many methodical steps. The GA falls in a class of algorithms used for optimization processes. Although the GA evolved in the mid-sixties it is only within the past ten years that it has actually been applied. The GA which utilizes the mechanisms of evolution, starts with a large population of potential wire configurations; the wire connections may be in series or parallel. It randomly selects a set of wire configurations, the performance of which is computed using an electromagnetic code. With an iterative method it moves toward more optimal solutions. The GA is particularly well suited for this process since it converges to the optimal solution rapidly, even when the problem is very complex.

This invention which includes a new process for the design of antennas, uses a completely deductive approach; that is, the desired electromagnetic properties of the antenna are specified and the wire configuration that most closely produces these results is then synthesized. The only constraint on the antenna design is its size; its shape is totally undefined.

For typical wire antennas there is a population of trillions of possible wire configurations that fall within a specified volume. The GA randomly selects a large set of potential solutions from this population and assigns a binary string of 0's and 1's to each wire configuration; the quality of the string is then rated. Partial solutions to the problem are obtained by initially combining parts of strings. As in the evolutionary process of "survival of the fittest", high quality strings mate and produce offspring; poor quality strings perish. With succeeding "generations" the quality of the strings continually improve and an optimal solution is ultimately obtained.

The following procedure is used to implement this process:

1. The desired electromagnetic properties of the antenna are specified. Typically the antenna will be required to have a maximum VSWR and particular directional and polarization properties over a designated bandwidth.

2. An electromagnetic code that computes the required antenna properties for each wire configuration designated by the GA is selected. We have used the NEC for the computations.

3. A cost function is formulated, with or without computer assistance, which will return a single number for a given trial. This number is a figure of merit of the desired characteristics chosen in step 1.

4. The user or computer determines the constraints of the design space (eg. size, shape, number of design points, maximum lengths of wire, number of wire segments). Some or all of the constraints can be made a part of the genetic string itself.

5. The number of bits to use in the genetic strings and the method of translating the strings into design features/ characteristics (e.g. points in space, wire locations, type of feature) are specified, making sure the genetic string will not produce errors that are going to crash the simulation and/or are not accounted for in the cost function.

6. All other genetic algorithm parameters—size of the population, number of generations, etc.—are specified.

7. The process is started and runs to completion as defined by either the computer or user.

8. The optimum design is output in some form (file, text, etc.) when the program has finished its run.

Figure 1:
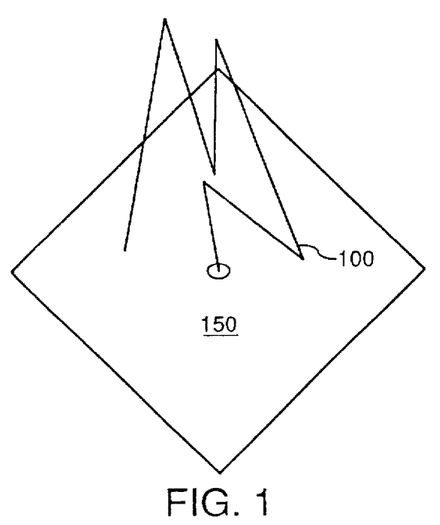
FIG. 1 is an illustration of a 6-segment wire antenna designed by the process of the present invention.
Figure 2:
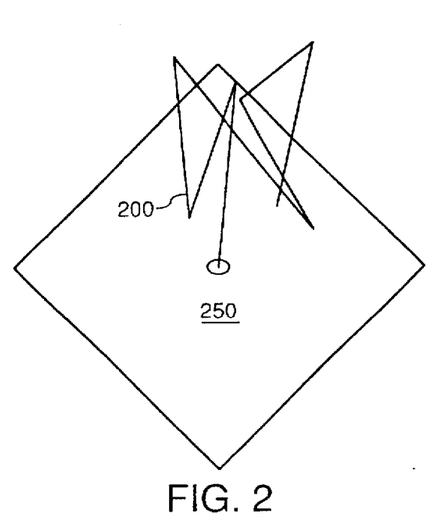
FIG. 2 is an illustration of a 7-segment wire antenna designed by the process of the present invention.

We have designed several antennas using our new process. We specified that the antenna should radiate a circularly polarized field in all directions 10 degrees or more above the horizon at a frequency of 1600 MHz. We limited the size of the antenna to a cube one-half wavelength on a side; the process was tried for antennas consisting of 5, 6, 7, and 8 wire segments. The best results were obtained using the 7-segment antenna; the 6-segment antenna was almost as good. The 5- and 8-segment antennas were somewhat poorer. The 6- and 7-wire antennas were also measured and the agreement with the computational results was excellent considering that the shape of the somewhat crudely fabricated antenna was not identical to the model that was computed; also the computations were done for an antenna over an infinite ground plane while the measurements were made over a finite ground plane. The coordinates for the vertices of the 6-segment and the 7-segment antennas are shown in Table 1; the 3-dimensional views are shown in FIGS. 1 and 2. The computed and measured results are in FIGS. 3 and 4. (The ripples in the measured data were caused by the finite ground plane.) It is seen that each of these antennas has a very weird shape in that each consists of a crooked wire going in haphazard directions. It is obvious that these designs could never be obtained using the inductive approach that has been used to design most wire antennas.

FIG. 1 is a three dimensional view of a 6-segment antenna (100) produced by the process of the present invention. The wire antenna projects through a ground plane (150) with six segments separated by sharp bends in the wire as designated by the computer.

TABLE 1

6- and 7-element wire antenna coordinates

| Startpoint (coordinates in meters) | | | Endpoint (coordinates in meters) | | |
|---|---|---|---|---|---|
| X | Y | Z | X | Y | Z |
| 6-element wire antenna | | | | | |
| 0.0000 | 0.0000 | 0.0000 | 0.0136 | −0.0015 | 0.0351 |
| 0.0136 | −0.0015 | 0.0351 | −0.0439 | 0.0136 | 0.0049 |
| −0.0439 | −0.0136 | 0.0049 | 0.0106 | 0.0197 | 0.0366 |
| 0.0106 | 0.0197 | 0.0866 | 0.0076 | 0.0237 | 0.0351 |
| 0.0076 | 0.0287 | 0.0351 | 0.0378 | −0.0166 | 0.0926 |
| 0.0378 | −0.0166 | 0.0926 | 0.0469 | 0.0469 | 0.0049 |
| 7-element wire antenna | | | | | |
| 0.0000 | 0.0000 | 0.0000 | −0.0166 | 0.0045 | 0.0714 |
| −0.0166 | 0.0045 | 0.0714 | −0.0318 | −0.0166 | 0.0170 |
| −0.0318 | −0.0166 | 0.0170 | −0.0313 | −0.0287 | 0.0775 |
| −0.0318 | −0.0287 | 0.0775 | −0.0318 | 0.0439 | 0.0140 |
| −0.0318 | 0.0439 | 0.0140 | −0.0318 | 0.0045 | 0.0624 |
| −0.0318 | 0.0045 | 0.0624 | −0.0106 | 0.0373 | 0.0866 |
| −0.0106 | 0.0378 | 0.0866 | −0.0106 | 0.0257 | 0.0230 |

TABLE 2    GANEC5.PAS

```pascal
{$N-}
{$M 65520,0,0}
program GA_for_NEC2_exec_program; {more general antenna generating,
                   specified number of wires} uses dos,crt;

type genetype = array[1..550,1..24] of integer;
    scoretype = array[1..550] of real;
    sorttype = array[1..550] of integer;
    matchmakertype = array[1..1000] of integer;
    xyztype = array[0..8,1..3] of real;
    matepooltype = array[1..3,1..120] of integer;

const {Though some depend on each other, Pascal does not allow constants to be
       defined with anything but actual numbers, so the user must ensure
       consistency.}
   M : integer = 550; {number of genes in genepool--approx N1*5}
   N : integer = 21;  {number of bits in gene w/ compression (numwires*3)}
   N1: integer = 105; {number of bits in gene w/o compression (numwires*15)}
   pop_prop_saved : real = 0.25; {population proportion saved each gen.}
   slots : integer = 1000; {number of openings in matchmaker lottery system}
   Generations : integer = 90; {number of generations}
   numangles : integer = 1188; {number of total angles}
   numth0 : integer = 33; {number of th0 values (incl. 0)}
   numph0 : integer = 36; {number of ph0 values (incl. 0)}
   freq : real = 1600; {frequency in MHz}
   checkbreak : boolean = true;
   numwires : integer = 7; {number of wire segments}

{remember to change "scoring" array values in cost procedure to match
    num*, also ensure angle values are correct in anal_par statements } big : real = 1E35; {arbit. large number--used in rankorder routine--should
                       be larger than any score of any gene} var genepool : genetype;
   xyz : xyztype;
   numsaved,i,l,gen : integer;
   score : scoretype;
   test,j1,i1,i2,i3,i4 : integer;
   temp:string;
   recfile,outfile:text;
   bitstream:string[60];
   bit : string[3];
   cost_P : boolean;

procedure cost(xyz:xyztype; var score:real); {to determine cost fcn of the gene
}
   var
     inputfile, outputfile,testfile: text;
     temp:string[7];
     i,j,s,t:integer;
```

GANEC5.PAS

```pascal
  temp4:string[37];
  temp5:string[3];
  axis :string[8];
  space:string[10];
  sense:string[4];
  gain: string[8];
  dev:array[1..1188] of real;
  polariz,dist,d,mean,prpo,dbpolar : real;
  numseg:real;

begin {cost}

{write the NEC input file}
d := 3e8 / (freq*1e6); {d = conversion factor from wavlen. to meters} assign(inputfile,'c:\pascal\ga.dat');
rewrite(inputfile);
writeln(inputfile,'CE');

for i := 1 to numwires do
 begin
   dist := sqrt( (xyz[i-1,1]-xyz[i,1])*(xyz[i-1,1]-xyz[i,1])+
                 (xyz[i-1,2]-xyz[i,2])*(xyz[i-1,2]-xyz[i,2])+
                 (xyz[i-1,3]-xyz[i,3])*(xyz[i-1,3]-xyz[i,3])  );

numseg := round(dist / 0.075 + 1);
   if dist > 0.001 then
       writeln(inputfile,'GW',i:2,',',numseg:3:0,',',
         xyz[i-1,1]*d:8:4,',',xyz[i-1,2]*d:8:4,',',xyz[i-1,3]*d:8:4,',',
         xyz[i,1]*d:8:4,',',xyz[i,2]*d:8:4,',',xyz[i,3]*d:8:4, ',0.001');
 end;
writeln(inputfile,'GE 1');
writeln(inputfile,'EX 0,1,1,0,1,0,0,0 ');
writeln(inputfile,'FR 0,1,0,0,',freq:8:4,',0.0 ');
writeln(inputfile,'EK 0');
writeln(inputfile,'GN 1,0');
writeln(inputfile,'RP 0,33,36,1011,-81.0,0.0,5.0,5.0'); {this line must be
              consistent with the global constants section regarding angles}
writeln(inputfile,'EN');

close(inputfile);

exec('c:\pascal\nec2.exe',' ga.dat ga.out '); {executes NEC simulation}
if doserror <> 0 then writeln(doserror);
for t := 1 to numangles do
      begin
         dev[t] := 0;
      end;

polariz := 0;

{reads the output file from NEC to compile score}
assign(outputfile,'c:\pascal\ga.out');
reset(outputfile);

temp := '';

repeat readln(outputfile,temp) until temp = ' DEGREE';
```

-13-

GANEC5.PAS

```
  for j :=  1 to numangles do
   begin
    read(outputfile,temp4);
    read(outputfile,gain);
    val(gain,dev[j],i);
    if i <> 0 then begin insert('0', gain, i); val(gain, dev[j],i); end;
    read(outputfile,temp5);
    read(outputfile,axis);
    val(axis,polariz,i);
    if i <> 0 then begin insert('0', axis, i); val(axis, polariz,i); end;
    read(outputfile,space);
    readln(outputfile,sense);
    if sense = 'LEFT' then polariz := -1*polariz;
    prpo := 0.5 + polariz/(polariz * polariz + 1);
    dbpolar := 10 * ln(prpo)/ln(10);
    dev[j] := dev[j] + dbpolar; {includes the polarization loss caused by not b
eing                         RH circ. polarized} end;

close(outputfile);

score := 0;
   mean := 0;

{computes mean of gain}
  for j:=1 to numangles do mean := mean + dev[j];
  mean := mean / numangles;

if (mean < -10.0) then mean := -10.0;

write('mean = ',mean:8:4);

for j := 1 to numangles do score := score
              + (dev[j] - mean)*(dev[j] - mean);

writeln(', score = ',score:8:4);

end; {cost} procedure firstgeneration(var genepool :genetype); {randomly generates
                                                      first generation} var
     i,j : integer;

begin {proc} randomize;
for i := 1 to M do
     begin {i loop}
```

-14-

GANECS.PAS

```pascal
    for j := 1 to N do
      begin
        genepool[i,j]:= round(random * 31);
      end;

end; {i loop}
end; {proc} procedure rankorder(var score : scoretype; var genepool: genetype);
                {places genes in order of fitness for later processing} var
    genetemp : genetype;
    scoretemp : scoretype;
    i,j :integer;
    sorted_ones : sorttype;
    templow : real;
    tempindex : integer;
    numsaved : integer;
    num_sorted : integer;
    bestscore : real;

begin {procedure} for i := 1 to M do sorted_ones[i] := 1;
   numsaved := trunc(M*pop_prop_saved);
   for i := 1 to numsaved do
    begin {i loop}
      templow := big;    {arbitarily large number--may change with problem}
      tempindex := 0;
      for j := 1 to M do
        begin {sort-loop}

{find the smallest score with sorted_ones value > 0}
         if (sorted_ones[j] > 0) and (score[j] < templow)
                  then begin
                         templow := score[j];
                         tempindex := j;
                       end;
       end; {sort-loop} scoretemp[i] := score[tempindex];
    {place the corresponding gene in the temp array}
       for j := 1 to N do genetemp[i,j]:= genepool[tempindex,j];

{set the sorted_ones value for that gene to 0}
      sorted_ones[tempindex] := 0;

{loop for next one}
     end; {i loop} for i := 1 to M do
     begin
       for j:= 1 to N do
        genepool[i,j] := genetemp[i,j];
       score[i] := scoretemp[i];
     end;
```

GANEC5.PAS

```
  end;

procedure generation(var genepool : genetype; score:scoretype ); {performes mat
ing
                                                                 and crossover t
o get
                                                                 the next genera
tion} var
  s,r,i,j,crossover:integer;
  matchmaker : matchmakertype;
  num_bins,numsaved:integer;
  genscore : scoretype;
  biggestscore : real;
  total : real;
  bin_pointer : integer;
  matepool:matepooltype;
  d1,d2,p,ind:integer;

begin {proc} numsaved := trunc(pop_prop_saved * M);
biggestscore := score[numsaved]+1;
total := 0;

for i := 1 to numsaved do
  begin
    genscore[i] := biggestscore - score[i];
    total := total + genscore[i];
  end;

bin_pointer := 1;
for i := 1 to slots do matchmaker[i] := 1;

for i := 1 to numsaved do
   begin
     num_bins := round(slots*genscore[i] / total);
     if bin_pointer + num_bins > slots then num_bins := slots - bin_pointer;

for j := bin_pointer to bin_pointer + num_bins do
         begin
           matchmaker[j] := i;
         end;

bin_pointer := bin_pointer + num_bins + 1;

end;

for i := numsaved+1 to M do
    begin  {i loop}
      r := 0;
      s := 0;

while r = s do
        begin
          r := matchmaker[trunc(random*slots)+1]; {1st gene to mate}
```

GANEC5.PAS

```
        s := matchmaker[trunc(random*slots)+1]; {2nd gene to mate}
      end;

ind := 1;
    for p := 1 to N do
            begin
                d1 := genepool[r,p];
                d2 := genepool[s,p];

matepool[1,ind] := d1 div 16;
                matepool[2,ind] := d2 div 16;
                d1 := d1 mod 16;
                d2 := d2 mod 16;

matepool[1,ind+1] := d1 div 8;
                matepool[2,ind+1] := d2 div 8;
                d1 := d1 mod 8;
                d2 := d2 mod 8;

matepool[1,ind+2] := d1 div 4;
                matepool[2,ind+2] := d2 div 4;
                d1 := d1 mod 4;
                d2 := d2 mod 4;

matepool[1,ind+3] := d1 div 2;
                matepool[2,ind+3] := d2 div 2;
                d1 := d1 mod 2;
                d2 := d2 mod 2;

matepool[1,ind+4] := d1 div 1;
                matepool[2,ind+4] := d2 div 1;

ind := ind + 5;
            end;

crossover := trunc(random * N1) + 1;
    for j := 1 to crossover do matepool[3,j] := matepool[1,j];
    for j := crossover+1 to N1 do matepool[3,j] := matepool[2,j];

ind := 1;
    for p := 1 to N do
      begin
        genepool[i,p] := matepool[3,ind]*16 + matepool[3,ind+1]*8 +
                         matepool[3,ind+2]*4 + matepool[3,ind+3]*2 +
                         matepool[3,ind+4];
        ind := ind + 5;
      end;

end; {i loop} end; {proc} procedure mutate(var genepool: genetype);

var
    p,d1,ind,num_bits_mutated,i,j,l:integer;
```

-17-

GANEC5.PAS

```pascal
    matepool:matepooltype;

begin {proc}
  num_bits_mutated := round(random*20)+1;
  for l := 1 to num_bits_mutated  do
   begin
     i := trunc(random * (M-trunc(pop_prop_saved*M))) + 2;
     j := trunc(random * N1) + 1;

ind := 1;
        for p := 1 to N do
                begin
                  d1 := genepool[i,p];

matepool[1,ind] := d1 div 16;
                  d1 := d1 mod 16;

matepool[1,ind+1] := d1 div 8;
                  d1 := d1 mod 8;

matepool[1,ind+2] := d1 div 4;

d1 := d1 mod 4;
                  matepool[1,ind+3] := d1 div 2;
                  d1 := d1 mod 2;

matepool[1,ind+4] := d1 div 1;

ind := ind + 5;
                end;
         if matepool[1,j] = 1 then matepool[1,j] := 0 else matepool[1,j] := 1;

ind := 1;
        for p := 1 to N do
         begin
           genepool[i,p] := matepool[1,ind]*16 + matepool[1,ind+1]*8 +
                           matepool[1,ind+2]*4 + matepool[1,ind+3]*2 +
                           matepool[1,ind+4];
           ind := ind + 5;
         end;

end;
end; {proc} procedure convert(genepool:genetype;l:integer; var xyz:xyztype);
var
    ind : integer;

begin ind := 1;
        for i := 1 to numwires do
          begin
            xyz[i,1] := -0.25 + (0.5)*(genepool[1,ind]/31);
            xyz[i,2] := -0.25 + (0.5)*(genepool[1,ind+1]/31);
```

GANEC5.PAS

```pascal
      xyz[i,3] := 0.01 + (0.5)*(genepool[1,ind+2]/31);
      ind := ind + 3;
    end;
      xyz[0,1]:= 0.0;
      xyz[0,2]:= 0.0;
      xyz[0,3]:= 0.0;

end; {convert} begin {main} gen := 0;
for l := 1 to M do score[l]:=0;
assign(recfile,'c:\pascal\fossils.rec');
rewrite(recfile);

numsaved := trunc(M*pop_prop_saved);

for gen := 1 to generations do
 begin{gen loop}
   if gen = 1 then firstgeneration(genepool) else generation(genepool,score);
   if gen > 1 then mutate(genepool);

for l := 1 to M do
      begin {l loop}
      if (gen > 1) and (l = 1) then l := numsaved + 1;
       {periodic cell dimensions in free space wavelen--a is X dir, b is Y} convert(genepool,l,xyz);

write(l:2,'..');

cost_P := true;

if gen > 1 then
        begin
         for i1 := 1 to l-1 do
          begin
           test := 0;
           for i := 1 to N do if (l > 1) then if genepool[i1,i] = genepool[l,i]
                              then test := test + 1;
           if test = N then begin score[l] := score[i1]; i1:=l-1;
                                  cost_P:= false;end;
         end;
        end;
       if cost_P then cost(xyz,score[l]);

end; {l loop} rankorder(score,genepool);

writeln(recfile,'Generation #',gen:3);

for j1 := 1 to trunc(M*pop_prop_saved) do
  begin
```

-19-

GANEC5.PAS

```pascal
    for i1 := 1 to N do write(recfile,genepool[j1,i1]:3);
    writeln(recfile,' has score:',score[j1]:15:6);
  end;
writeln(recfile);
writeln;
write('Gen #',gen:3,' ');

for i := 1 to N do write(genepool[1,i]:3);
writeln(' with score: ',score[1]:12:5);
if keypressed then if readkey = 'X' then gen := generations;

end; {gen loop} writeln('The best gene is: ');
for i := 1 to N do write(genepool[1,i]:3);
writeln(' with score: ', score[1]:12:5);

close(recfile);
bitstream := '';
for i := 1 to N do
      begin
        str(genepool[1,i]:3,bit);
        bitstream := bitstream + ' ' + bit;
      end;

assign(outfile,'c:\pascal\bitstrm');
rewrite(outfile);
writeln(outfile,bitstream);
close(outfile);
convert(genepool,1,xyz);
cost(xyz,score[1]);

end. {main}
```

Figure 3:
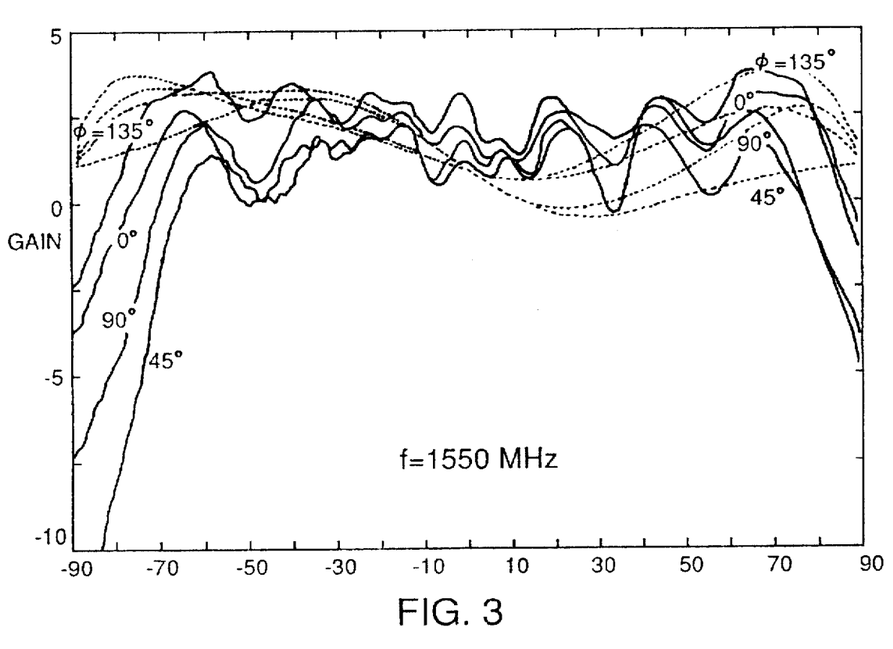
FIGS. 3 and 4 are plots of the radiation patterns of the antennas shown in FIGS. 1 and 2.
Figure 4:
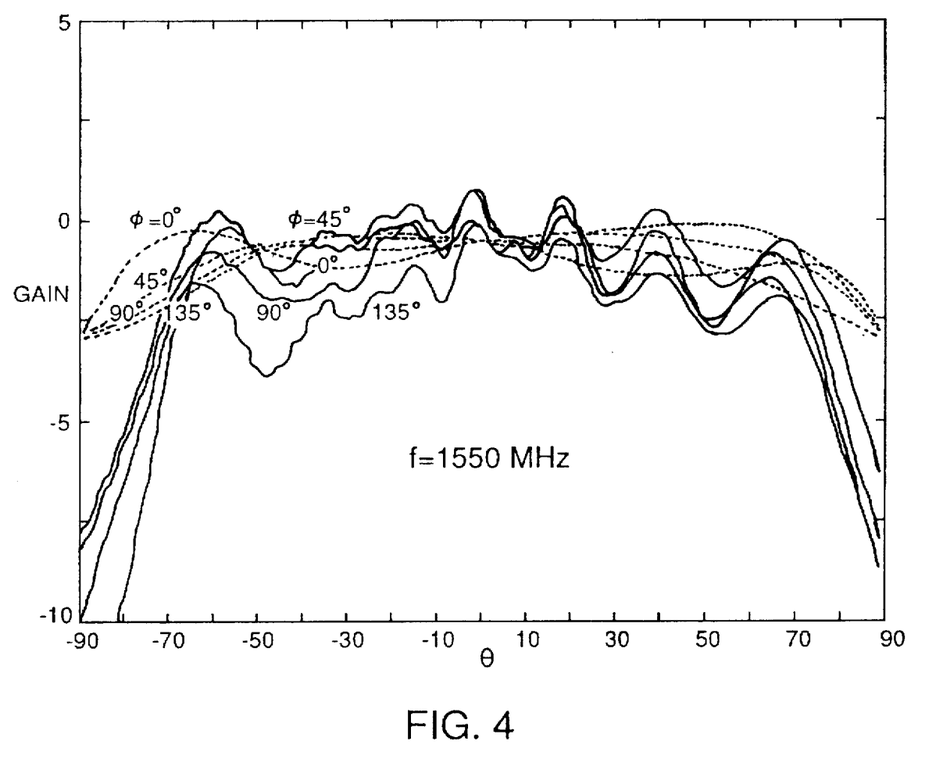

FIG. 2 is a similar three dimensional view of a 7-segment antenna (200) projecting through a ground plane (250), as designed using the process of the present invention. The main point of FIGS. 1 and 2 is that these designs would probably not be conceived by a human engineer, but their test results (shown in FIGS. 3 and 4) indicate they optimize the antenna performance. FIG. 3 is a plot of the test results of the antenna of FIG. 1. The dotted lines are the computed results and the solid lines are measured results. FIG. 4 is a similar plot for the antenna of FIG. 2.

As described above, the present invention may be conceptually reduced to a four-step process of designing a antenna using a computer. This process includes the steps of:

loading a general purpose computer with a genetic algorithm and an electromagnetic code, the genetic algorithm (given in Table 2) being a preselected set of permutations of alternative geometric configuration possibilities within a three-dimensional volume and wherein the electromagnetic code being a correlation model that correlates antenna prospectives from geometric antenna configurations, specifying to the general purpose computer a desired set of antenna properties;

directing the general purpose computer to identify a final set of antenna designs from the set of antenna prospectives by testing the preselected set of permutations proposed by the genetic algorithm using the electromagnetic code; and selecting an antenna design from the final set of antenna designs.

This new process will revolutionize the design procedure for antennas. The electromagnetic properties of most antennas that have been used in the past are well known. Currently an antenna designer will select a type of antenna that has properties close to his needs and then optimize that particular antenna. For example, if one needed a circularly polarized antenna to operate over a specified bandwidth with a specified beamwidth a helical design might be chosen. The helix dimensions (length, diameter, number of turns and pitch) would be optimized for that particular application. In our design process the desired electromagnetic properties are specified; the shape of the wire antenna is not; the process determines the optimal shape for the particular application. This process should prove most valuable for the design of antennas that have firm specifications in terms of antenna size and electromagnetic properties, as is often the case. The resultant antenna will be extremely cheap since it will usually be made of copper wire, or a printed circuit.

The process we have invented evolved from two technologies. First, the power of today's fast computers makes it possible to simulate antenna structures very quickly and with a good deal of accuracy. Second, the advent of genetic algorithms has made automated optimization of very difficult problems possible. This new process should replace the conventional inductive design procedure that has been used.

Our new approach allows the computer free reign to design and synthesize an antenna structure with little human intervention, save for the cost function which defines the desired antenna properties and the constraints, for example, the size of the structure. For instance, in the method which we used to synthesize the 7-segment crooked antenna, we allowed the computer to choose from among $2^{105}$ different possible antenna configurations. Each antenna has different characteristics in that the currents from the different wire segments affect the antenna pattern in a different way for each configuration. Thus, this process is not simply a program which determines a few or even several unknowns for a basic antenna structure. For the 7-segment antenna it was given a large number of points (32,768) it could choose as an endpoint for each of its seven wires, and set free to find an optimum configuration. An obvious advantage of our process, then, is that a human designer will no longer have to figure out the basic concept of the antenna design that will solve a given problem. He can simply create or help create a cost function that will give the antenna the proper blend of characteristics (broadband, high gain, or whatever), set the constraints, and let the computer go to work.

We are only aware of one case in which a genetic algorithm has been used in the design of an antenna, Bahr, et al. In this design the shape of the antenna and the number of impedance loads are initially specified; the genetic algorithm determines only the optimal values of the impedances and the locations on the monopole in which they are inserted. In our process we would not specify a monopole configuration; we would simply allow the algorithm to determine the optimal shape of the antenna as well as the other optimal parameters.

A surprising feature of this process is that the type of antenna that resulted is completely counter-intuitive—we can say with some confidence that no human antenna designer would analytically arrive at this configuration to try to achieve hemispherical coverage of a right-hand circularly-polarized electromagnetic wave. The theory behind its success at performing this function is not at all obvious; its theory of operation is a very difficult problem to solve, let alone design and optimize. Therefore, an advantage of this method that is very attractive is that it will try solutions that humans would never think of, and, most of the time, those counter-intuitive solutions will be better than those produced by a human designer. The crooked wire antenna out-performs antennas that have been in use up to this time, even antennas costing much more to fabricate. Yet, people have been designing antennas for many years and have not come up with anything that even resembles this antenna in appearance or operation.

This new process uses a state-of-the-art electromagnetic code in conjunction with a state-of-the-art genetic algorithm. We have demonstrated that this combination produces good results. However, it should be possible to obtain a more efficient process by modifying the code and the algorithm so that they are more compatible. Our initial designs have used straight wire segments connected in series. It should be possible to connect some of the wires in parallel and use curved wire segments. Also the wires could be impedance loaded. In addition, other geometries besides simple wire structures could be optimized; for example, printed antennas and microstrip and patch antennas, and any other antenna that can be simulated using an electromagnetic code.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process to synthesize a design of an antenna element in three dimensions using a computer, said process comprising the steps of:

loading a general purpose computer with a genetic algorithm model and an electromagnetic code, said genetic algorithm model being a preselected set of permutations of alternative geometric configuration possibilities for a wire antenna element within a three-dimensional volume and wherein said electromagnetic code is a correlation model that correlates antenna element prospectives from genetic antenna configurations;

specifying to said general purpose computer a desired set of electromagnetic antenna element properties;

directing said general purpose computer to identify a final set of wire antenna element designs from the set of wire antenna element prospectives by testing the preselected set of permutations proposed by the genetic algorithm using in three dimensions the electromagnetic code; and selecting a wire antenna element design from the final set of wire antenna element designs.

2. The antenna designed by the process of claim 1.

3. A process, as described in claim 1, wherein said electromagnetic code comprises the Numerical Electromagnetics Code.

4. The antenna designed by the process of claim 3.

5. A process, as defined in claim 1, wherein said specifying step comprises identifying electromagnetic antenna properties comprising: radiation pattern, antenna input impedance, frequency range and polarization.

6. The antenna designed by the process of claim 5.

7. A process, as defined in claim 3, wherein said specifying step comprises identifying electromagnetic antenna properties comprising: radiation pattern, antenna input impedance, frequency range and polarization.

8. The antenna designed by the process of claim 7.

9. A process as defined in claim 1 where the antenna is impedance loaded.

10. The antenna designed by the process of claim 9.

11. A process as defined in claim 1 where the antenna is a microstrip antenna, patch antenna or any other antenna that can be analyzed using an electromagnetic code.

12. The antenna designed by the process of claim 11.

13. A process to synthesize a design of a wire or printed antenna element in three dimensions using a computer, said process comprising the following steps:

a. loading an algorithm comprising a space of possible solutions represented by some representational scheme which, by some iterative process, will converge to an optimal solution, to be used in conjunction with an electromagnetic code onto a general purose computer;

b. specify the desired set of electromagnetic properties for the antenna element to be designed;

c. list constraints on antenna size, geometry and/or features;

d. specify a sample population size to be randomly or otherwise selected from among all possible antenna element configurations, given the constraints in c.;

e. compute the electromagnetic properties of each antenna element configuration in three dimensions in the sample population using the electromagnetic code and rank solutions in order of performance;

f. modify the population by some method which brings the population incrementally closer to an optimum solution;

g. continue this iterative process a specified number of generations or until the population fitness reaches equilibrium; this is considered the optimal solution.

14. The antenna designed by the process of claim 13.

* * * * *